Oct. 16, 1934.
F. KUHN ET AL
1,976,787
ELECTRIC IRON
Filed March 18, 1929
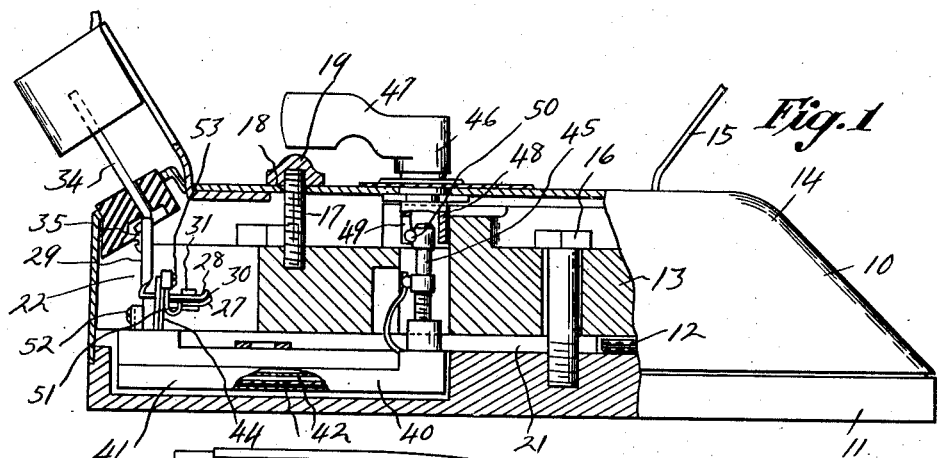
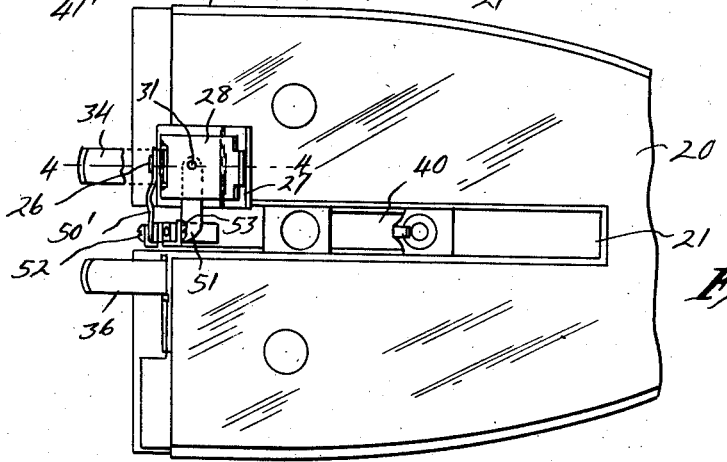
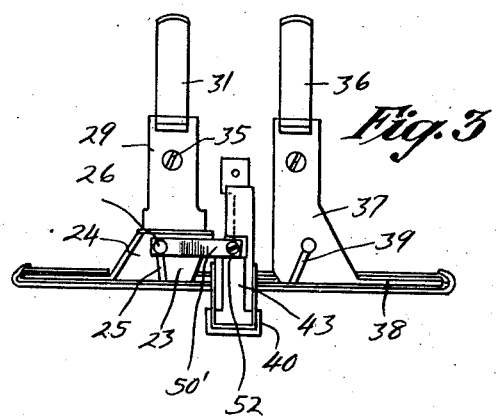 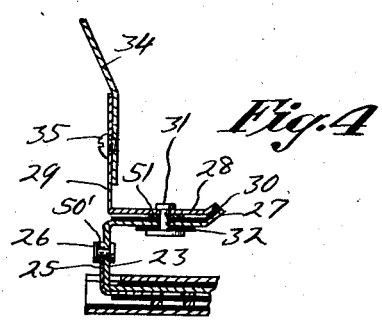
INVENTORS
Frank Kuhn
Laurence H. Thomas
BY
ATTORNEYS Patented Oct. 16, 1934

1,976,787

UNITED STATES PATENT OFFICE 1,976,787

ELECTRIC IRON

Frank Kuhn and Laurence H. Thomas, Detroit, Mich., assignors to American Electrical Heater Company, Detroit, Mich., a corporation of Michigan Application March 18, 1929, Serial No. 348,064

2 Claims. (Cl. 219—25)

This invention relates to electric heaters and more particularly to thermostatically controlled electric irons.

One of the primary objects of this invention is to provide a thermostatically controlled heater assembly wherein the thermostatic switch is capable of being readily detached from or attached to the heater as a unit so that in the event the switch becomes defective it may be readily replaced without replacing any other part of the heater.

Another object of this invention is to provide a heater having a thermostatic switch free from any connection with the heater except through its detachable electrical connections to the heating element. This arrangement facilitates assembly as it permits the heating element and thermostatic switch to be assembled as a unit upon the heater.

A further object of this invention is to provide a heater assembly having a manually adjustable thermostatic switch wherein the adjustable element projecting from the switch is capable of angular movements relative to the heater so as to automatically align itself with the control means normally positioned exteriorly of the heater.

Other objects and novel features of construction of this invention will be made more apparent as this description proceeds, especially when considered in connection with the accompanying drawing, wherein:

Figure 1 is a longitudinal sectional view through a heater assembly constructed in accordance with this invention, Figure 2 is a plan view of the heating element showing the switch attached thereto, Figure 3 is a rear elevation of the construction shown in Figure 2, and Figure 4 is a sectional view taken on the line 4—4 of Figure 2.

Referring now to the drawing it will be noted that there is illustrated an electric iron 10 having a heat distributing base plate 11, a heating element 12 seated upon the base 11, a pressure plate 13 bearing upon the heating element and a hood 14 also seated upon the base and provided with the conventional handle not shown. For holding the base plate 10, heating element 12 and pressure plate 13 in assembled position we provide a series of bolts 16 having the heated portions thereof bearing upon the top surface of the pressure plate and the shank portions thereof extending through apertures formed in the pressure plate and threaded into the base plate 11. The hood 14 is preferably held in proper assembled position upon the heater by a single stud element 17 threaded into the pressure plate 13 and projecting upwardly therefrom through a suitable opening 18 formed in the top of the hood and adapted to receive the clamping nut 19.

As particularly shown in Figure 2 of the drawing, the heating unit is completely encased by a metallic covering 20 and is provided with an elongated slot 21 extending from the rear edge of the same to a point adjacent the center thereof. Secured to the rear end of the heating element adjacent the slot is a bracket assembly 22. This assembly comprises a supporting member 23 having an upwardly extending portion 24 electrically connected to the heating element by means of a conductor 25 extending from the heating element and secured to the upwardly extending portion 24 by means of a suitable fastening element 26. The upwardly extending portion 24 of the supporting member 23 terminates in a laterally projecting flange 27 forming a support for the base 28 of a terminal contact carrying lug 29. As shown in Figure 1 of the drawing, the base 28 is insulated from metallic contact with the flange 27 by means of a suitable insulating strip 30 and is secured to the flange 27 by a fastening element 31, which, as shown, is also insulated from metallic contact with the flange 27 by means of the mica washer 32. It will also be noted from Figure 1 of the drawing that the upper portion of the lug 29 preferably carries a terminal contact 34 which is detachably secured to the lug by means of a screw 35.

The cooperating terminal contact 36 is detachably secured to a lug 37 having a base portion 38 secured to the heating element 12 adjacent the bracket assembly 22 upon the opposite side of the slot 21. The contact element 36 is electrically connected to the heating element 12 by means of a suitable conductor 39 extending from the heating element and secured to the lug 37.

For controlling the temperature of the iron a suitable thermostatic switch 40 is provided having a casing 41 and bi-metallic thermostatic strips 42 secured at one end to the casing. As shown, the switch is arranged directly beneath the slot 21 in the heating element and is provided at the rear end thereof with terminal contact elements 43 and 44. The latter are electrically connected to the strips 42 and are adapted to extend upwardly through the slot 21 adjacent the bracket assembly 22. Threadedly mounted upon the forward end of the thermostatic casing adjacent the free ends of the bi-metallic switch is a suitable adjusting element 45. The latter preferably extends upwardly from the thermostat through the slot 21 and through aligned openings in the pressure plate 13 and hood 14 to a control element 46 outside of the hood. The lower portion of the adjusting element is arranged in the path of travel of the lowermost thermostatic strip so as to intercept the same at a predetermined point to effect a separation of this strip from the upper strip under changing temperature conditions.

The control element 46 is rotatably mounted upon the hood and is provided with a handle portion 47 disposed exteriorly of the hood and with a sleeve-like portion 48 depending from the handle 47 and projecting into the iron. The sleeve-like portion 48 is adapted to detachably receive the upper end portions of the adjustable element 45. In order to effect a driving relation between the control handle 47 and the element 45 the sleeve-like portion 48 is provided with a longitudinally extending, elongated slot 49 adapted to receive a lug 50 projecting laterally from the element 45 adjacent the upper end thereof.

For securing the thermostatic switch in the assembly and at the same time electrically connecting the thermostat in the circuit the conductors 50' and 51 are provided. The conductor 50' is secured to the supporting member and electrically connected to the heating element by the fastening element 26 and is detachably secured to the thermostatic switch terminal 43 by means of a screw 52. The conductor 51, on the other hand, is preferably secured to the lug 29 and electrically connected to the terminal contact 34 by means of the fastening element 31 which also functions to secure the bracket in assembled position. The free end of the conductor 51 is detachably secured to the thermostatic terminal 34 by means of a screw 53.

Thus from the foregoing it will be apparent that the flexible conductors 50' and 51 connecting the rear end of the thermostatic switch to the heating element constitutes the only means for securing the thermostatic switch to the assembly. By virtue of this arrangement several outstanding advantages are derived among which are, first, the rapidity with which the thermostatic switch may be detached as a unit from the heater by merely removing the screws 52 and 53, second, permits angular movements of the thermostatic unit relative to the remaining parts of the heater, which is extremely important in assembling the heater as it permits the adjustable member 45 to align itself with the sleeve 48 of the control element 46 and thereby compensates for any slight inaccuracies in manufacture, and, third, prevents binding of the adjustable member 45 during rotation of the same.

What we claim as our invention is:

1. In an electrically heated iron having a removable cover, a heat distributing plate having a recess therein, a pressure plate positioned above the distributing plate, a heating element interposed between the two plates, means responsive to temperature changes in the iron for controlling the operation of the heating element including a switch supported in said recess for movement bodily relative to either of said plates, means on the switch for varying its response to different temperatures, control means on the cover for adjusting said varying means, said control means being engageable with said varying means when the cover is placed over said plates, and flexible electrical conductors constituting the sole connection between the switch and the heating element and adapted to permit said bodily movement of the switch thereby to insure engagement of the control means with said varying means.

2. In an electrically heated iron having a removable cover, a heat distributing plate having a recess therein, a pressure plate positioned above the distributing plate, a heating element interposed between the two plates, means responsive to temperature changes in the iron for controlling the operation of the heating element including a switch supported in said recess for movement bodily relative to either of said plates, a rotatable element on the switch for varying its response to different temperatures, a control handle on the cover for adjusting said rotatable element, said handle having a portion projecting into the iron for engagement with said rotatable element when the cover is placed over said plates, and flexible electrical conductors constituting the sole connection between the switch and the heating element and adapted to permit said bodily movement of the switch thereby to insure engagement of said portion with said rotatable element.

FRANK KUHN.
LAURENCE H. THOMAS.